(12) United States Patent
Beck et al.

(10) Patent No.: US 8,101,151 B2
(45) Date of Patent: *Jan. 24, 2012

(54) VALVE METAL-OXIDE POWDER AND METHOD FOR PRODUCING SAID POWDER

(75) Inventors: Karsten Beck, Goslar (DE); Hady Seyeda, Vienenburg (DE); Klaus Lerch, Kaarst (DE); Bianca Agnes Balan, Braunschweig (DE)

(73) Assignee: H.C. Starck GmbH, Goslar (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/542,786

(22) Filed: Aug. 18, 2009

(65) Prior Publication Data

US 2010/0028678 A1 Feb. 4, 2010

Related U.S. Application Data

(63) Continuation of application No. 10/571,153, filed as application No. PCT/EP2004/009674 on Aug. 31, 2004, now Pat. No. 7,674,450.

(30) Foreign Application Priority Data

Sep. 12, 2003 (DE) .................................. 103 42 600

(51) Int. Cl.
 *C01G 25/00* (2006.01)
(52) U.S. Cl. ....... 423/594.17; 423/66; 75/343; 75/10.62
(58) Field of Classification Search ............. 423/594.17, 423/66

See application file for complete search history.

(56) References Cited

U.S. PATENT DOCUMENTS

| | | | |
|---|---|---|---|
| 3,112,991 A | 12/1963 | Fisher | |
| 5,384,306 A | 1/1995 | Konig et al. | |
| 6,123,062 A | 9/2000 | Rapoport et al. | |
| 6,136,062 A | 10/2000 | Loffelholz et al. | |
| 6,338,832 B1 | 1/2002 | Brown et al. | |
| 7,066,979 B2 | 6/2006 | Loeffelholz et al. | |
| 7,674,450 B2 * | 3/2010 | Beck et al. .................... | 423/606 |
| 2003/0082097 A1 | 5/2003 | Brown et al. | |
| 2003/0230167 A1 | 12/2003 | Loeffelholz et al. | |

FOREIGN PATENT DOCUMENTS

| | | |
|---|---|---|
| DE | 42 14 724 A1 | 11/1993 |
| DE | 44 22 761 C1 | 3/1996 |
| DE | 10 30 7716 A1 | 9/2003 |
| WO | WO-97/13724 | 4/1997 |

OTHER PUBLICATIONS

Maria Ziolek, "Niobium-containing Catalysts—the State of the Art," *Catalysis Today* 78, 2003, pp. 47-64.

Takuya Tsuzuki et al., "Mechanochemical Synthesis of Niobium Pentoxide Nanoparticles," *Materials Transactions*, vol. 42, No. 8, 2001, pp. 1623-1628.

Junko N. Kondo et al., "Synthesis and Property of Mesoporous Tantalum Oxides," *Topics in Catalysis*, vol. 19, No. 2, Apr. 2002, pp. 171-177.

Claus Feldmann et al., "Polyol-Mediated Preparation of Nanoscale Oxide Particles," *Angew. Chem. Int. Ed.*, vol. 40, No. 2, 2001, pp. 359-362.

Hiroshi Kominami et al., "Novel Solvothermal Synthesis of Niobium(v) Oxide Powers and Their Photocatalytic Activity in Aqueous Suspensions," *J. Mater. Chem.*, vol. 11(2), 2001, pp. 604-609.

Claus Feldmann et al., "Polyol-vermittelte Praparation Nanoskaliger Oxidpartikel," *Angew. Chem.*, vol. 113, No. 2, 2001, pp. 372-374.

* cited by examiner

*Primary Examiner* — Steven Bos
(74) *Attorney, Agent, or Firm* — Connolly Bove Lodge & Hutz LLP

(57) ABSTRACT

A process for the production of a valve metal oxide powder, in particular an $Nb_2O_5$ or $Ta_2O_5$ powder by continuous reaction of a fluoride-containing valve metal compound with a base in the presence of water and calcination of the resultant product, wherein the reaction is performed in just one reaction vessel and at a temperature of at least 45° C. Valve metal oxide powders obtainable in said manner which exhibit a spherical morphology, a $D_{50}$ value of 10 to 80 μm and an elevated BET surface area.

11 Claims, 2 Drawing Sheets

VALVE METAL-OXIDE POWDER AND METHOD FOR PRODUCING SAID POWDER

RELATED APPLICATIONS

This application is a continuation application of U.S. patent application Ser. No. 10/571,153, filed Nov. 7, 2006 now U.S. Pat. No. 7,674,450, which is incorporated by reference in its entirety, which is a national stage application (under 35 U.S.C. §371) of PCT/EP2004/009674, filed Aug. 31, 2004, which claims benefit of German Application No. DE 103 42 600.0, filed Sep. 12, 2003.

BACKGROUND OF THE INVENTION

The invention relates to a process for the production of a valve metal oxide powder, in particular an $Nb_2O_5$ or $Ta_2O_5$ powder, and to valve metal oxide powders obtainable in this manner which exhibit a spherical morphology, an average particle size of 10 to 80 μm and an elevated BET surface area.

Valve metals, especially those from subgroups 4 to 6 of the periodic system of elements and among these in particular tantalum and niobium, and the alloys thereof, have many and varied applications. Valve metals are generally produced by reduction of suitable valve metal compounds, in particular by reduction of valve metal oxides.

Valve metal oxide powders are, however, of interest not only as starting materials for the production of corresponding metal powders, but also for numerous further applications. For example, niobium and tantalum oxides with elevated specific surface areas are used in the production of mixed metal oxide materials which have applications, for example, as catalysts and/or functional ceramics.

If, when producing such metal oxide materials, it is desired to achieve not only good intermixing of tantalum oxide and/or niobium oxide with the further reactants, such as for example potassium carbonate or molybdenum trioxide, but also performance of the reaction at the lowest possible temperature, a spherical morphology of the valve metal oxides in conjunction with an elevated specific surface area are advantageous. In "Catalysis Today 78 (2003) 47-64", M. Ziolek provides a review of niobium-containing catalysts. The most important class of compounds is stated to be niobium oxides which should if possible exhibit an elevated specific surface area.

Processes for the production of niobium and tantalum oxides with elevated specific surface area have already been described in the literature. However, the oxides produced by these processes do not generally exhibit a spherical morphology or they are nanoscale valve metal oxide powders.

DE 4 214 724 C2 accordingly describes the production of fine ceramic powders of a narrow grain size distribution in a gas phase reaction. By reacting niobium or tantalum pentachloride with oxygen, it is possible in this manner to produce niobium and tantalum pentoxides which, according to the Example, exhibit a specific surface area of 42 $m^2/g$. However, due to the performance of the reaction in the gas phase and the liberation of gaseous chlorine, this process is highly complex. The $Nb_2O_5$ produced according to the Example moreover contains a total of 700 ppm of metallic impurities.

In "Materials Transactions, vol. 42, no. 8 (2001), 1623-1628", T. Tsuzuki and P. G. McCormick describe a mechanochemical synthesis for niobium pentoxide nanoparticles. In this synthesis, solid niobium pentachloride is reacted with solid magnesium oxide or sodium carbonate to produce $Nb_2O_5$ with an elevated specific surface area of 43.3 to 196 $m^2/g$. However, solid-phase reactions proceed only very slowly. Reaction times of several hours are described. A further disadvantage of this method is that, due to the process, the resultant products are severely contaminated with sodium. Niobium pentoxides contaminated in this manner have a tendency when heat treated (T>550° C.) to form $Na_2Nb_4O_{11}$ phases.

In "Topics in Catalysis, vol. 19, no. 2, 2002, 171-177", J. N. Kondo, Y. Takahara, B. Lee, D. Lu and K. Domen describe processes for the production of mesoporous tantalum oxides. Using the so-called NST (neutral surfactant template) method, tantalum(V) chloride is hydrolysed by means of the moisture present in ambient air by addition of the chelating ligand poly(alkylene oxide) block copolymer Pluronic P-123 (BASF). The resultant $Ta_2O_5$ exhibits a very high specific surface area. Disadvantages of this process are not only the long reaction time of at least 6 days but also the evolution of gaseous HCl. $Ta_2O_5$ with an elevated specific surface area of 330 to 410 $m^2/g$ is also obtained by the so-called LAT (ligand-assisted templating) method. According to this method, tantalum(V) ethoxide is hydrolysed with addition of octadecylamine. However, the resultant product is neither thermally nor mechanically stable and is thus not usable for large scale industrial applications or for further processing. In addition, the tantalum(V) ethoxide used is very costly.

Nanoscale $Nb_2O_5$ powders with elevated specific surface areas may also be prepared according to C. Feldmann and H.-O. Jungk (Angew. Chem. 2001, 113, no. 2, 372-374) by hydrolysis of niobium ethoxide in diethylene glycol. Niobium pentoxides prepared in this manner exhibit a specific Brunauer-Emmett-Teller (BET) surface area of about 100 $m^2/g$. Disadvantages of this process are that the tantalum(V) ethoxide used is very costly and only nanoscale oxide particles can be obtained.

Niobium pentoxide with an elevated specific surface area of 232 $m^2/g$ may also be prepared according to H. Kominami, K. Oki, M. Kohno, S. Onoue, Y. Kera and B. Ohtani (Journal of Materials Chemistry 2002, 11(2), 604-609) by hydrolysis of niobium butoxide in toluene. Disadvantages of this process are both the possible environmental impact associated with the use of toluene as solvent and the high price of the niobium butoxide used.

DE 103 07 716 A1 discloses that spherical niobium and tantalum oxides may be produced by precipitation of heptafluorotantalic acid ($H_2TaF_7$) or heptafluoroniobic acid ($H_2NbF_7$) or mixtures thereof from a hydrofluoric solution by means of bases, in particular ammonia ($NH_3$). This yields tantalic acid $Ta(OH)_5$ or niobic acid $Nb(OH)_5$ or mixtures thereof, which may then be converted into the corresponding oxide by heat treatment or calcination as it is known. These oxides, however, exhibit low specific surface areas of 0.41 to 0.58 $cm^2/g$.

WO 97/13724 A1 discloses a process for the production of valve metal oxides by precipitating $H_2TaF_7$ or $H_2NbOF_5$ by means of ammonia. Precipitation is performed in at least two reaction vessels connected in series, wherein temperature, pH and residence time are separately adjusted in each reaction vessel. In this manner, it is possible purposefully to adjust the specific surface areas and densities of the valve metal oxides produced. Valve metal oxides with an elevated surface area and low density and valve metal oxides with a small surface area and high density are described. According to WO 97/13724 A1, valve metal oxides with an elevated surface area are, however, taken to mean those valve metal oxides which exhibit a BET surface area of greater than 2 $m^2/g$ ($Nb_2O_5$) or of greater than 3 $m^2/g$ ($Ta_2O_5$). The maximum BET surface area value stated for tantalum pentoxide particles is 11 $m^2/g$. The maximum BET surface area obtained in the Examples is 6.7 $m^2/g$ (Example 6). Scanning electron micrographs of valve metal oxides with an elevated surface area show that these products exhibit irregular morphologies (FIGS. 3A to 3D and FIGS. 5A to 5D). Spherical valve metal oxide powders with an elevated BET surface area thus cannot be obtained according to WO 97/13724 A1. A further disadvantage of the procedure according to WO 97/13724 A1 is that, because the reaction is performed in at least two reaction vessels in which the essential process parameters must in each case be separately adjusted, it is associated with greater complexity of the control system.

A SUMMARY OF THE INVENTION

The object of the invention is to provide valve metal oxide powders, in particular $Nb_2O_5$ and $Ta_2O_5$ powders, which are in particular suitable for solid-state reactions, for example for use as a catalyst or for the production thereof and as electroceramics or for the production thereof, and to state a simple process for the production of such valve metal oxide powders.

The object is achieved by valve metal oxide powders which exhibit a spherical morphology, a $D_{50}$ value of 10 to 80 μm and an elevated BET surface area, and by a process for the production thereof by precipitation of fluoride-containing valve metal compounds with a base at elevated temperature.

A BRIEF DESCRIPTION OF THE FIGURES

A DETAILED DESCRIPTION OF THE INVENTION

Figure 1:
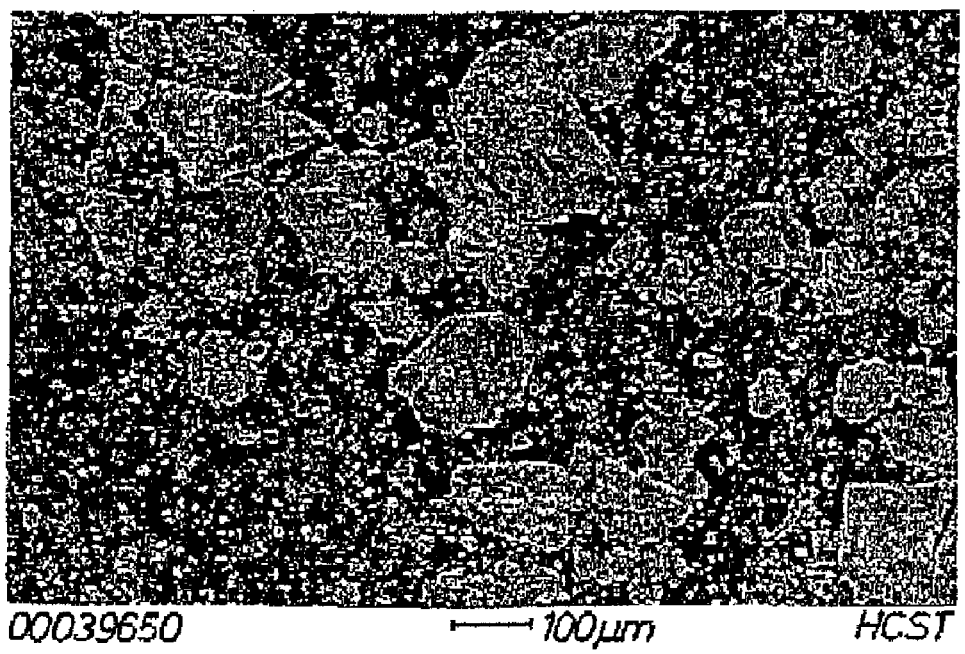
FIG. 1 shows a scanning electron micrograph of the resultant $Nb_2O_5$ at 100 times magnification. It can clearly be seen that the individual powder particles are irregularly shaped and are in part in lamellar form.

The present invention accordingly provides a process for the production of a valve metal oxide powder by continuous reaction of a fluoride-containing valve metal compound with a base in the presence of water and calcination of the resultant product, wherein the reaction is performed in just one reaction vessel and at a temperature from 45° C. up to the boiling point of the reaction mixture at approx. 105° C.

When a fluoride-containing valve metal compound reacts with a base in the presence of water, valve metal hydroxides are generally formed, for example niobic acid ($Nb(OH)_5$) or tantalic acid ($Ta(OH)_5$). Such valve metal hydroxides are insoluble in aqueous systems and thus precipitate out from the reaction mixture. This reaction is accordingly often described as a precipitation or precipitation reaction.

According to the invention, the precipitation reaction proceeds at elevated temperature, the temperature preferably being 50 to 75° C., particularly preferably 55 to 70° C.

Although the reaction of the fluoride-containing valve metal compound with the base may in principle also proceed batchwise or semi-continuously, according to the invention the precipitation reaction is performed continuously. According to the invention, the procedure is that both the fluoride-containing valve metal compound and the base are continuously supplied to a reaction chamber and the product arising from the reaction is continuously drawn off.

The reaction proceeds in just one single reaction vessel. This has the advantage that the complexity of the plant and control systems can be kept to a minimum. The reaction vessel may comprise, for example, a stirred-tank reactor, a tubular reactor or a loop reactor. A stirred-tank reactor is preferably used.

The water necessary for the reaction may be initially introduced into the reaction chamber and replenished as required. It is most advantageous, however, to use the fluoride-containing valve metal compound and the base used in each case in the form of an aqueous solution or suspension. The water is thus added together with the reactants, so permitting continuous performance of the reaction while ensuring a constant concentration of the reaction partners.

The valve metal is preferably niobium and/or tantalum, Heptafluoroniobic acid ($H_2NbF_7$) or heptafluorotantalic acid ($H_2TaF_7$) are correspondingly preferably used as the fluoride-containing valve metal compound.

Depending on the desired purity of the valve metal oxide powder, it may be necessary, optionally repeatedly, to purify the fluoride-containing valve metal compound or the base before the reaction. In this manner, the content of impurities may, as required, be reduced down to the parts per billion (ppb) range.

The fluoride-containing valve metal compound is preferably used as an aqueous solution, wherein the concentration of fluoride-containing valve metal compound, relative to the valve metal, amounts preferably to 0.3 to 1.2 mol/l, particularly preferably to 0.6 to 0.9 mol/l.

Ammonia, alkali metal hydroxide or alkaline earth metal hydroxide are preferably used as the base, ammonia particularly preferably being used. The base used very particularly preferably comprises an aqueous ammonia solution with an ammonia concentration of 3 to 15 wt. %, preferably of 5 to 10 wt. %, particularly preferably of 6 to 10 wt. %.

The reaction of the fluoride-containing valve metal compound with the base is preferably performed at a pH value, measured at reaction temperature, of 7 to 14, particularly preferably at a pH value, measured at reaction temperature, of 7.0 to 8.0.

When the reaction is performed according to the invention, volumetric flow rates are preferably adjusted such that the ratio of the volumetric flow rate of an aqueous solution of a fluoride-containing valve metal compound to the volumetric flow rate of an aqueous solution of the base is from 1:0.9 to 1:2, preferably from 1:1.0 to 1:1.5. By suitable selection of the volumetric flow rates and the concentrations of the solutions used, the molar concentration ratio of fluoride-containing valve metal compound, calculated as valve metal, to base is preferably adjusted to a value of 1:5.6 to 1:8.5.

The absolute volumetric flow rate of the aqueous solution of a fluoride-containing valve metal compound preferably amounts to 1 to 1000 l/h, particularly preferably to 200 to 600 l/h.

The residence time of the precipitation product in the reaction chamber amounts for example to between 0.25 and 24 h, but preferably to between 30 min and 3 h.

The resultant spherical precipitation product, a valve metal hydroxide, is generally separated by filtration, washed and dried and then calcined to yield the valve metal oxide. If necessary, mechanical processing such as screening, crushing, grinding or agglomeration may follow. If such mechanical processing is performed with a correspondingly high input of energy, the spherical morphology may be destroyed and the valve metal oxide converted into another morphology.

The precipitation product is preferably washed with deionised water. The washing operation is particularly preferably performed in multiple stages, wherein washing is first of all performed once or repeatedly with the aqueous solution of a base, preferably the base also used for precipitation, and then washing is performed once or repeatedly with deionised water.

Washing is generally followed by a drying step. Drying is performed preferably at a temperature of 50-150° C., particularly preferably of 70-110° C. The drying time preferably amounts to 1 to 100 h, particularly preferably to 10 to 30 h.

In order to convert the precipitation product into the desired valve metal oxide, a heat treatment at elevated temperature, or calcination as it is known, is required. Calcination is preferably performed at a temperature of 250-1400° C., particularly preferably of 300-600° C. Calcination time is preferably 0.1 to 100 h, particularly preferably 1 to 50 h, especially preferably 1 to 5 h. Calcination is preferably performed under non-reducing conditions, for example in the presence of noble gas or room air, preferably in the presence of atmospheric oxygen.

The structure of the valve metal oxide particles may be stabilised by a high temperature treatment, preferably in the temperature range >1000° C., particularly preferably close to the melting point of the oxides. In this manner, sintered bridges between the primary grains may be strengthened and the pore structure purposefully varied.

After the optional high temperature treatment, mechanical processing such as screening, crushing or grinding may then follow. Any introduced impurities such as carbon may be removed by post-calcining in air, preferably at temperatures of between 800 and 1200° C.

The process according to the invention enables the production of spherical valve metal oxide powders with an average particle diameter $D_{50}$, determined by MasterSizer to ASTM B 822, of 10 to 80 µm, preferably of between 15 and 40 µm, and an elevated BET surface area, determined by the $N_2$ 3-point method according to ASTM D 3663, of at least 10 m²/g.

The resultant valve metal oxide powders are furthermore distinguished by a very narrow grain size distribution of the spherical agglomerates. Valve metal oxides produced according to the invention may be converted by reduction into valve metal powders or valve metal suboxides which exhibit surface areas and capacitance values comparable with previously known high capacitance powders. In contrast to the latter, flowability is retained. Such powders are thus ideally suited to the production of capacitor anodes and capacitors. Thanks to the homogeneous grain size distribution and comparatively small agglomerate size, a uniform packing density in the anode is obtained and thus an improvement in quality and yield for the user. Furthermore, the secondary structure may also be adjusted such that good impregnation properties of the agglomerates are retained even with a very fine primary structure.

The present invention accordingly also provides spherical valve metal oxide powders with an average particle diameter $D_{50}$, determined by MasterSizer to ASTM B 822, of 10 to 80 µm, and a BET surface area, determined by the $N_2$ 3-point method according to ASTM D 3663, of at least 10 m²/g.

Such valve metal oxide powders may be obtained by the process according to the invention.

Imaging methods are used for determining the morphology of the valve metal oxide powders. A two-dimensional image of a powder sample is obtained using a scanning electron microscope at 200 times magnification. To this end, the powder is applied onto a square slide with an adhesive surface. An area is investigated in which at least 200 particles are visible. The powder particles visible in this image are evaluated. To this end, a circle is laid around an imaged powder particle, the circle touching the two maximally distant points on the circumference of the particle. A further circle with an identical centre point is drawn, but now touching the two minimally distant points on the circumference of the particle. The ratio of the diameter of these two circles is used as a criterion for describing the morphology of the valve metal oxide powder. An ideally spherical powder particle exhibits a ratio of 1 because all the points on the surface of the powder particle are equally distant from the centre point of the particle.

Spherical valve metal oxide powders, i.e. valve metal oxide powders whose powder particles are of an approximately spherical shape, are taken to mean such powders in which at least 95% of the powder particles exhibit a ratio of the diameter of the larger circle to the diameter of the smaller circle of 1.0 to 1.4.

The average particle diameter $D_{50}$, determined by MasterSizer to ASTM B 822, is preferably 15 to 40 µm.

The BET surface area, determined by the $N_2$ 3-point method according to ASTM D 3663, is preferably at least 15 m²/g, particularly preferably at least 20 m²/g, especially preferably at least 40 m²/g and most especially preferably at least 60 m²/g. The maximum BET surface area is preferably 225 m²/g.

The valve metal oxide powders according to the invention are preferably a niobium or tantalum oxide powder, for example $NbO_2$, $NbO$, $Nb_2O_5$, $TaO_2$, $TaO$, $Ta_2O_5$ powder or a niobium or tantalum suboxide, particularly preferably an $Nb_2O_5$ or $Ta_2O_5$ powder.

The invention is illustrated in greater detail below by Examples, which are intended to elucidate the principle of the invention without constituting a limitation thereof.

EXAMPLES

The metal oxide powders or metal powders produced in the following Examples were investigated as stated in the Examples with regard to various chemical and physical properties. Unless otherwise stated, the following procedures were used: Grain size distribution ($D_{10}$, $D_{50}$ and $D_{90}$ values) was determined by laser diffraction using a MasterSizer Sµ from MALVERN (ASTM B 822) and the specific surface area was determined by the Brunauer, Emmett and Teller known method (BET method) using the $N_2$ 3-point method according to ASTM D 3663. Unless otherwise stated, percentages are stated in weight percent.

Comparative Example 1

$Nb_2O_5$ with an Elevated Specific Surface Area 80 ml of deionised water were added with stirring to 200 ml of niobium(V) ethoxide. The resultant niobium(V) hydroxide (niobic acid) was filtered out with a nutsch filter and washed with deionised water. The niobium(V) hydroxide was then dried for 17 hours at 100° C. and then calcined for 4 hours at 500° C. in air. 280 g of $Nb_2O_5$ with a specific surface area of 80 m²/g were obtained.

FIG. 1 shows a scanning electron micrograph of the resultant $Nb_2O_5$ at 100 times magnification. It can clearly be seen that the individual powder particles are irregularly shaped and are in part in lamellar form.

Comparative Example 2

Spherical $Nb_2O_5$ with a Small Specific Surface Area

In an initial amount of 200 l of deionised water, 7490 l of aqueous $H_2NbF_7$ solution (Nb concentration: 80 g/l) were continuously precipitated with 7500 l of 9% aqueous $NH_3$ solution. The temperature of the solution was approx. 32° C., the pH value being adjusted to 7.6±0.4. The resultant suspension was filter-pressed with a pressure nutsch filter, then washed with 3% aqueous $NH_3$ solution and then with deionised water. The resultant moist niobium(V) hydroxide was dried for 24 h at 100° C. in a drying cabinet. Calcination of the dried niobium(V) hydroxide in air at a temperature of 400° C. for 2 h yielded an $Nb_2O_5$ powder with a specific surface area of 1.6 $m^2/g$.

Comparative Example 3

$Ta_2O_5$ with Elevated Specific Surface Area

An excess of deionised water was added with stirring to 1000 ml of tantalum(V) ethoxide. The resultant tantalum(V) hydroxide was filtered out with a nutsch filter and washed with deionised water. The tantalum(V) hydroxide was then dried for 17 h at 75° C. 872.1 g of tantalum(V) hydroxide with a residual water content of 9.78% were obtained. 55 g of this material were calcined for 2 hours at 500° C. in air. The resultant $Ta_2O_5$ exhibited a specific surface area of 76 $m^2/g$.

Comparative Example 4

Spherical $Ta_2O_5$ with a Low Specific Surface Area

In an initial amount of 300 l of deionised water, 6360 l of aqueous $H_2TaF_7$ solution with a concentration of approx. 82 g/l of Ta were continuously precipitated with 5655 l of 6% aqueous $NH_3$ solution in such a manner that the pH value was 7.6±0.4. The temperature of the solution was approx. 35° C. The resultant suspension was filter-pressed with a pressure nutsch filter, then washed with a 3% aqueous $NH_3$ solution and then with deionised water. The resultant moist tantalum (V) hydroxide was dried for 24 h at 100° C. in a drying cabinet and then calcined for 2 hours at 400° C. in air. The $Ta_2O_5$ produced in this manner exhibited a specific surface area of 1 $m^2/g$.

Example 1

In an initial amount of 300 l of deionised water, 3700 l of aqueous $H_2NbF_7$ solution with a concentration of 84 g/l of Nb were continuously precipitated in a stirred-tank reactor with 5500 l of 6% aqueous $NH_3$ solution. The aqueous $H_2NbF_7$ solution was added at a volumetric flow rate of 300 l/h and the 6% aqueous $NH_3$ solution at a volumetric flow rate of 450 l/h. The pH value was adjusted to 7.6±0.4. The temperature of the solution was 56° C. The resultant suspension was filtered out with a pressure nutsch filter, then washed with 3% aqueous $NH_3$ solution and then with deionised water. The moist niobium(V) hydroxide was dried for 24 h at 100° C. in a drying cabinet. Calcination of the dried niobium(V) hydroxide at a temperature of 500° C. for 2 h yielded an $Nb_2O_5$ powder which exhibited a specific surface area of 94 $m^2/g$ and a spherical morphology.
MasterSizer analysis values [μm]:
D10 1.77
D50 17.26
D90 33.27

Example 2

In an initial amount of 400 l of deionised water, 4662 l of aqueous $H_2NbF_7$ solution with a concentration of 81 g/l of Nb were continuously precipitated with 4600 l of 9% aqueous $NH_3$ solution. The aqueous $H_2NbF_7$ solution was added at a volumetric flow rate of 300 l/h and the 9% aqueous $NH_3$ solution at a volumetric flow rate of 300 l/h. The pH value was adjusted to 7.6±0.4. The temperature of the solution was 63° C. The resultant suspension was filtered out with a pressure nutsch filter, then washed with 3% aqueous $NH_3$ solution and then with deionised water. The resultant moist niobium(V) hydroxide was dried for 24 h at 100° C. in a drying cabinet. The niobium(V) hydroxide exhibited a specific surface area of 201 $m^2/g$ and a largely spherical morphology. Calcination for 2 h at a temperature of 500° C. yielded an $Nb_2O_5$ powder with a specific surface area of 116 $m^2/g$ and a spherical morphology.
MasterSizer analysis values [μm]:
D10 2.10
D50 20.21
D90 37.28

Figure 2:
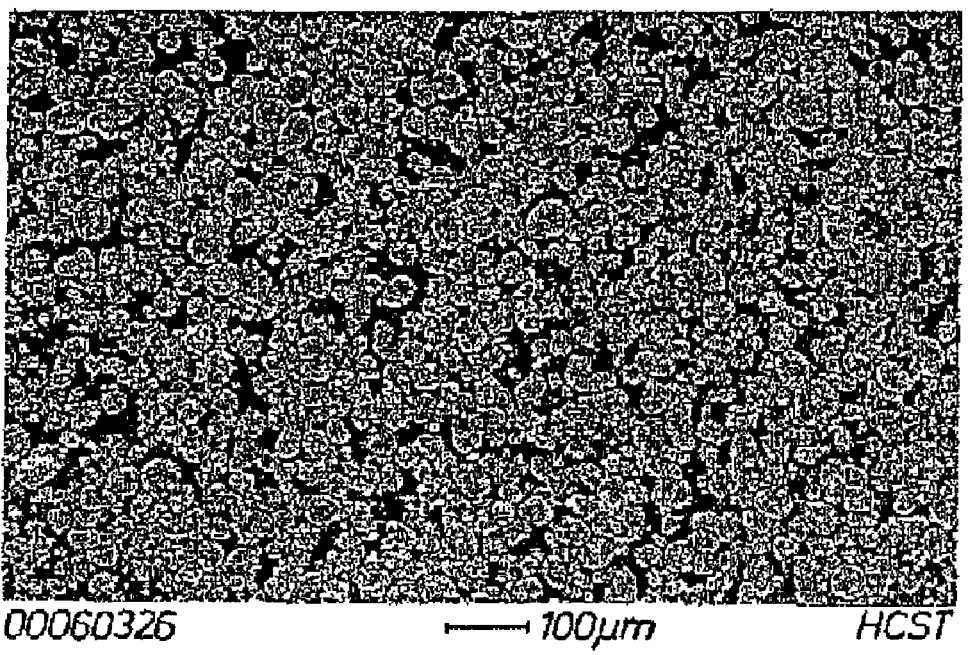
FIG. 2 shows a scanning electron micrograph (SEM) of the obtained $Nb_2O_5$ powder (100 times magnification). The spherical morphology is clearly visible.

FIG. 2 shows a scanning electron micrograph (SEM) of the obtained $Nb_2O_5$ powder (100 times magnification). The spherical morphology is clearly visible.

Example 3

In an initial amount of 400 l of deionised water, 9020 l of aqueous $H_2NbF_7$ solution with a concentration of 80 g/l of Nb were continuously precipitated with 10000 l of 9% aqueous $NH_3$ solution. The aqueous $H_2NbF_7$ solution was added at a volumetric flow rate of 300 l/h and the 9% aqueous $NH_3$ solution at a volumetric flow rate of 300 l/h. The pH value was adjusted to 7.6±0.4. The temperature of the solution was 69° C. The resultant suspension was filtered out with a pressure nutsch filter, then washed with 3% aqueous $NH_3$ solution and then with deionised water. The resultant moist niobium(V) hydroxide was dried for 24 h at 100° C. in a drying cabinet. Calcination for 2 h at a temperature of 400° C. yielded an $Nb_2O_5$ powder with a specific surface area of 140 $m^2/g$ and a spherical morphology.
MasterSizer analysis values [μm]:
D10 2.60
D50 20.97
D90 38.12

Figure 3:
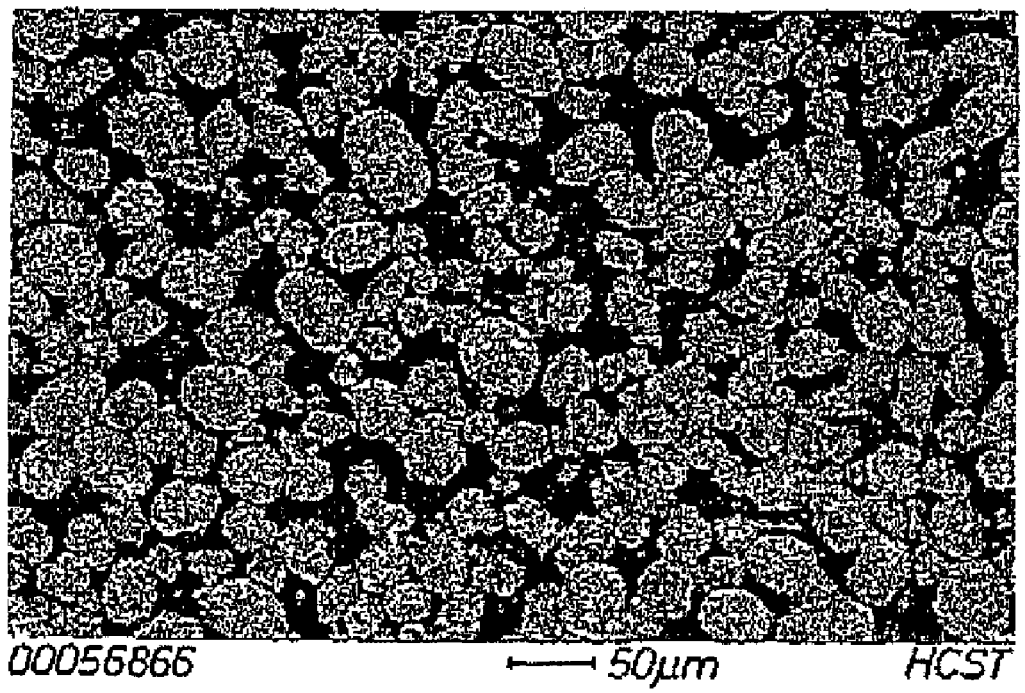
FIG. 3 shows a scanning electron micrograph (SEM) of the obtained $Nb_2O_5$ powder (200 times magnification). The spherical morphology is clearly visible.

FIG. 3 shows a scanning electron micrograph (SEM) of the obtained $Nb_2O_5$ powder (200 times magnification). The spherical morphology is clearly visible.

The invention claimed is:

1. A spherical valve metal oxide powder with an average particle diameter $D_{50}$, of 10 to 80 μm, characterized in that the BET surface area is at least 10 $m^2/g$.

2. The valve metal oxide powder according to claim 1, wherein the valve metal oxide is a niobium oxide or tantalum oxide.

3. The valve metal oxide powder according to claim 2, wherein the valve metal oxide is $Nb_2O_5$ or $Ta_2O_5$.

4. The valve metal oxide powder according to claim 1, wherein the BET surface area, is at least 15 $m^2/g$.

5. The valve metal oxide powder according to claim 1, wherein the BET surface area is at least 20 $m^2/g$.

6. The valve metal oxide powder according to claim 1, wherein the BET surface area is at least 40 $m^2/g$.

7. The valve metal oxide powder according to claim 1, wherein the BET surface area is at least 60 $m^2/g$.

8. The valve metal oxide powder according to claim 1, wherein when applying said powder onto a square slide with an adhesive surface, an area is measured in which at least 200 particles are visible, and the powder particles visible in this image are evaluated by laying a circle around an imaged powder particle, the circle touching the two maximally distant points on the circumference of the particle, a further circle with an identical center point is drawn, but now touching the two minimally distant points on the circumference of the particle, the ratio of the diameter of these two circles is used as a criterion for describing the morphology of the valve metal oxide powder wherein at least 95% of the powder particles exhibit a ratio of the diameter of the larger circle to the diameter of the smaller circle of 1.0 to 1.4.

9. A process for the production of valve metal powders or valve metal suboxide powders which comprises converting the valve metal oxide powder according to claim 1 to a valve metal powder or valve metal suboxide powder by reduction.

10. The valve metal oxide powder according to claim 8, wherein the BET surface area is at least 60 m$^2$/g.

11. The valve metal oxide powder according to claim 3, wherein the BET surface area is at least 60 m$^2$/g.

* * * * *